Patented Apr. 27, 1948

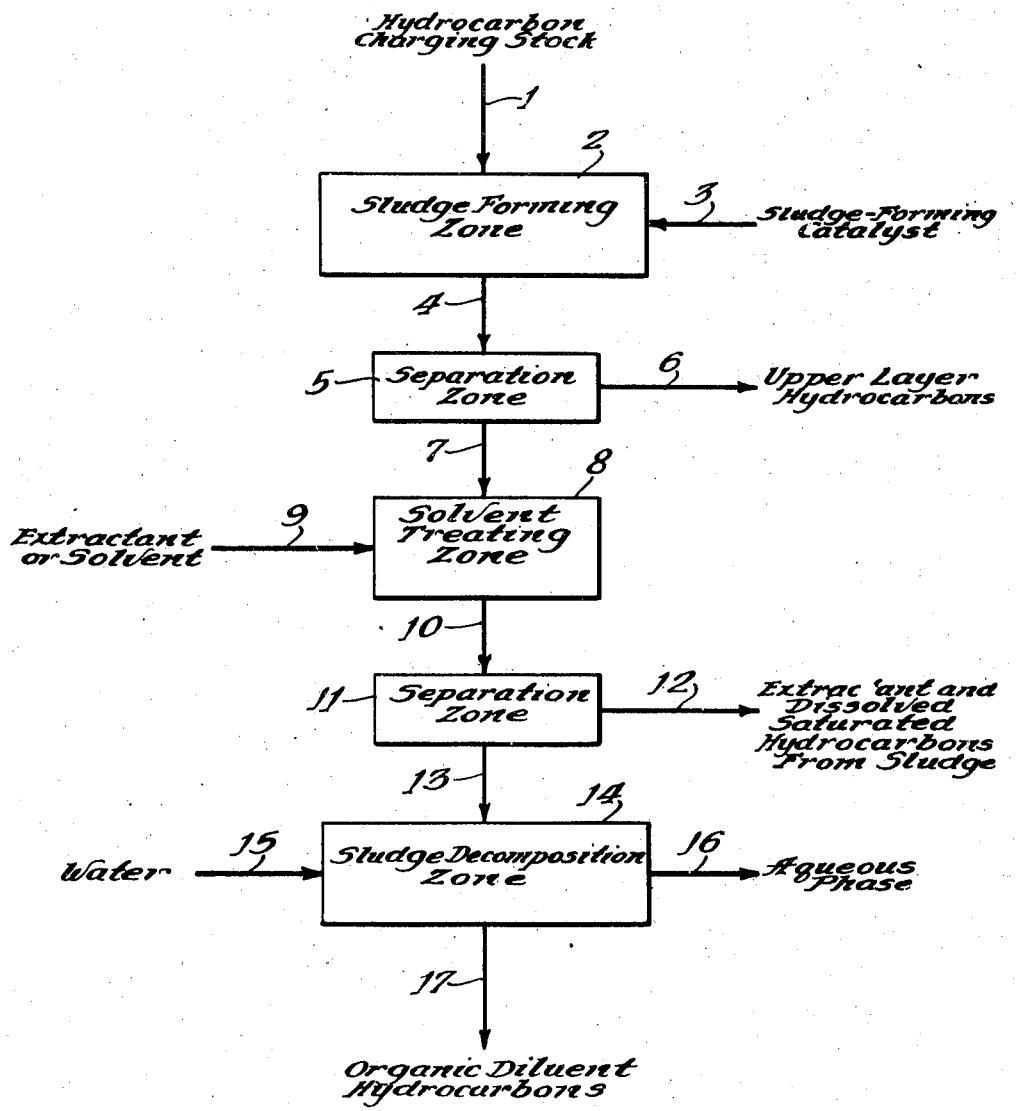

2,440,459

UNITED STATES PATENT OFFICE 2,440,459

SYNTHETIC DRYING OILS

Herman S. Bloch, Riverside, Ill., assignor to Universal Oil Products Company, Chicago, Ill., a corporation of Delaware Application April 28, 1944, Serial No. 533,258

9 Claims. (Cl. 196—78)

This is a continuation-in-part of my copending application Serial No. 481,282 filed March 31, 1943, which has matured to U. S. Patent No. 2,413,310, issued December 31, 1946.

This invention relates to an improvement in the manufacture of synthetic drying oils.

An object of the invention is to provide improvements in the manufacture of a drying oil material prepared by reacting petroleum hydrocarbons in the presence of a catalyst, separating the reaction products into a hydrocarbon phase and a catalyst phase, and recovering the drying oil from the catalyst phase.

A further object of my invention comprises an improvement in the manufacture of a material having the properties of a drying oil suitable for use in varnishes, paints and other protective and decorative coatings by treating the used catalyst phase which is separated from a hydrocarbon conversion process effected in the presence of a catalyst capable of causing conjunct polymerization of olefins such as hydrogen fluoride, sulfuric acid, aluminum chloride with or without hydrogen chloride or organic chlorides, and the like.

Broadly my invention comprises reacting a hydrocarbon charging stock in the presence of a catalyst, separating the reaction material into a hydrocarbon phase and a catalyst phase, removing high boiling relatively saturated hydrocarbons from the catalyst phase and recovering from the treated catalyst phase an oil having the properties of a drying oil.

When hydrocarbon conversion reactions are carried out in the presence of a catalyst such as aluminum chloride, hydrogen fluoride, sulfuric acid and the like, the used catalyst phase contains certain valuable organic compounds associated with the catalyst, presumably in the form of a catalyst-hydrocarbon complex. It is this organic material which can be recovered from the used catalyst phase by decomposing said complex which is referred to in the present specification and claims as organic diluent.

In preparing synthetic drying oils from a catalyst hydrocarbon complex formed during the catalytic conversion of hydrocarbons, I have found that the organic diluent of the catalyst complex often dries to a film which is permanently sticky and tacky rather than to one which is hard and firm to the touch, as is required in coating compositions. I have now discovered that if the catalyst complex is treated to remove relatively saturated material (having a boiling point up to about 371° C.) which is entrained or dissolved in the catalyst phase and which is not separable from the drying oil after decomposition of the catalyst complex, the resulting drying oil product has greatly improved drying properties and sets to a firm hard film. Unless this higher boiling saturated material is removed, it acts as a tackifier in the dried film as it is too high boiling to evaporate from the drying oil.

In one embodiment the present invention relates to an improvement in a process for the preparation of a drying oil by reacting a hydrocarbon charging stock in the presence of a catalyst, introducing the reaction mixture into a settling zone and therein separating an upper hydrocarbon layer from a lower catalyst layer containing organic diluent, separating catalyst from the catalyst layer and recovering the organic diluent, said improvement comprising subjecting the catalyst phase to extraction with a suitable solvent to remove high boiling relatively saturated compounds prior to decomposition of said catalyst phase.

The present invention is particularly beneficial in the treatment of the catalyst phase recovered from processes wherein the charging stock comprises olefinic hydrocarbons. It is less applicable in the preparation of drying oils in which low boiling saturated hydrocarbons comprise a major portion of the charging stock since in these processes the catalyst phase undergoes continuous extraction with evaporatable hydrocarbons and the concentration of high boiling saturated hydrocarbons in the hydrocarbon phase, from which they may be dissolved by the catalyst phase, is low.

In addition to processes in which a catalyst complex is specifically prepared for the purpose of manufacturing drying oils, the desired organic diluent may also be secured from the catalyst phase formed in processes such as the alkylation of isoparaffins with olefins, the isomerization of hydrocarbons, cracking, etc.

The material which may be employed to remove the undesirable high boiling saturated compounds from the catalyst phase includes any relatively low boiling nonreactive hydrocarbon such as propane, butanes, pentane, petroleum ether, aromatic hydrocarbons such as toluene or benzene, etc. Any solvent which is inert toward the hydrocarbon-catalyst complex, which is sufficiently volatile to evaporate from films of paints or varnishes, and which is substantially immiscible with the catalyst-hydrocarbon complex is suitable for this purpose. Thus, if the complex is of such composition that the catalyst is incapable of extensive further reaction, low-boiling, olefin-containing extractants may be used, or ethers may be employed, such as diethyl ether or dioxane. Such extractive materials should in general boil below about 200° C. or at most below about 250° C.—the upper boiling range of evaporatable paint solvents or thinners commonly used. Petroleum distillate cuts boiling within this range are quite suitable and may be conveniently employed for extractive purposes in this process.

A typical operation for the manufacture of a drying oil may be carried out according to the following description in which the reacting materials comprise an olefinic charging stock and a hydrogen fluoride catalyst.

A hydrocarbon charge containing normally gaseous and/or normally liquid olefins is treated in the presence of hydrogen fluoride under sufficient pressure to maintain the mixture in substantially liquid phase, said pressure usually being below about 500 pounds per square inch. Intimate contact between the hydrocarbons and catalyst may be maintained by some form of agitation, such as mixing, stirring, etc., so as to form a mixture or emulsion of hydrocarbon and hydrogen fluoride. A reaction temperature of from about −18° C. to about 149° C. and preferably from about 10° to about 93° C. is usually employed. Upon completion of the reaction, the products are allowed to settle, and a hydrocarbon layer is separated from the catalyst layer.

The catalyst phase is then directed to a solvent treating zone wherein it is commingled with a low boiling non-reactive hydrocarbon solvent and thoroughly mixed. The mixture of catalyst phase and solvent is then allowed to stratify and the raffinate, comprising the catalyst complex from which undesirable saturated material has been removed, is separated from an upper extract layer comprising the solvent and the saturated high boiling material.

From the solvent treating zone the catalyst phase, from which the undesirable, high boiling relatively saturated compounds have been removed, is directed to an acid-recovery zone wherein hydrogen fluoride is separated by distillation, treatment with water and/or aqueous alkali or other suitable means. Most suitably it is recovered as, or reconverted to, anhydrous hydrogen fluoride and recycled to the reaction zone.

The remaining material after removal of hydrogen fluoride may be treated in a number of ways to remove any free acid left and to obtain a purified drying oil. A simple method comprises either steam or vacuum distillation to recover an oil having the desired properties.

In an alternate method of operation, the purified organic diluent may be recovered by commingling the catalyst layer with water or with aqueous hydrogen fluoride of constant-boiling composition. The water serves to dissolve any free acid present, while the organic diluent rises to the top of the mixture and may be withdrawn. If desired, the fluidity of the catalyst layer may be increased by commingling it with a non-reactive hydrocarbon, such as pentane, and after thorough mixing the solution is treated with a suitable alkaline reagent to neutralize any remaining free acid present. The treated mixture is then directed to a separation zone in which the hydrocarbon solvent is removed by suitable means, such as distillation, and the finished drying oil product recovered. The hydrocarbon solvent may be recycled for further use.

The drying oil product is a sweet-smelling material ranging in color from light yellow to dark brown and on exposure to air dries to a solid film. It has an average molecular weight of from about 250 to about 500, although oils having molecular weights of as low as about 100 to as high as about 1000 have been prepared, these oils comprising compounds of substantially the same homologous structure and chemical properties. These properties include average bromine numbers of about 120 to about 200; average number of double bonds per molecule of more than 2 and less than 5; densities of about 0.85 to about 0.95; specific dispersions of about 125 to about 175 (but usually below about 145); specific refractions of about 0.327 to about 0.335, and carbon to hydrogen ratios close to 1:1.65.

Similarly, if the organic diluent is to be recovered from a used catalyst phase resulting from the conversion of hydrocarbons in the presence of a catalyst comprising sulfuric acid or a metal halide such as aluminum chloride, the catalyst phase is separated from the upper hydrocarbon layer as hereinbefore set forth. The catalyst phase is then directed to a solvent treating zone where it is subjected to extraction to remove the undesirable high boiling relatively saturated material. The extraction may be effected by bubbling in a light hydrocarbon such as petroleum ether through the mixture of acid and hydrocarbons. The catalyst phase may then be subjected to hydrolysis in the presence of any residual light hydrocarbon, refluxing the material under conditions such that the temperature is maintained at a substantially constant level. The mixture is allowed to settle, sufficient alkaline reagent added to effect neutralization of the mixture, the hydrocarbon layer separated from the aqueous layer and the low boiling hydrocarbons removed by distillation, followed by recovery of the drying oil product. By commingling an inert low boiling hydrocarbon with the hydrolyzing medium, the exothermic heat of hydrolysis which is liberated is dissipated, thus preventing or diminishing undesirable polymerization reactions which may take place. Low boiling hydrocarbons which may be used include propane, butane, pentanes, or a mixture thereof.

The process of the present invention will be further described in relation to the accompanying flow diagram which illustrates some of the specific embodiments of the present invention. Referring to the diagram, a suitable hydrocarbon charging stock as hereinabove described, for example an olefinic polymer gasoline, is introduced through line 1 into sludge-forming zone 2 wherein it is contacted with a sludge-forming catalyst such as hydrogen fluoride introduced into zone 2 through line 3. The reactants are preferably stirred to obtain intimate contact between the hydrocarbon and catalyst reactants and are maintained within the reactor at a temperature of from about −18° to about 149° C. and preferably at a superatmospheric pressure sufficient to maintain the reactants in liquid phase, especially when hydrogen fluoride is employed as the sludge-forming catalyst. As the reaction proceeds, the reaction mixture is vigorously stirred in zone 2, forming an emulsion between the sludge, catalyst and hydrocarbons present therein which upon settling separates into two distinct phases, a lower layer containing substantially all of the hydrogen fluoride charged to the reaction in a combined form as the intermediate sludge reaction product and an upper hydrocarbon layer containing predominantly saturated hydrocarbons as the other product of the sludge-forming reaction. In order to effect the separation of the two layers, the reaction product formed in zone 2 is withdrawn through line 4 into separation zone 5, wherein it is permitted to stand quiescent until separation of the above indicated phases has taken place. The upper layer, comprising chiefly saturated hydrocarbons, is withdrawn through line 6 and discharged from the process or otherwise treated to recover valuable hydrocarbon by-products therefrom. The lower sludge layer separating in zone 5 is withdrawn through line 7 and charged into solvent treating zone 8 wherein said sludge is contacted with the extractant herein provided for removing entrained and/or dissolved saturated hydrocarbons normally present in the sludge, thereby improving the drying properties of the hydrocarbon organic diluent recovered in the subsequent stages of the process by decomposition of the sludge. The extractant, such as a low boiling paraffinic hydrocarbon, is charged into solvent treating zone 8 through line 9 and is contacted therein, preferably accompanied by some form of agitation, as for example, by stirring or other mixing means with the sludge previously charged into zone 8. The mixture of extractant and sludge is then conveyed from zone 8 through line 10 into separation zone 11 where the respective extract and raffinate (sludge) phases are allowed to stratify into two distinct layers. The extract layer comprising the extractant and the saturated hydrocarbons removed from the sludge by the extraction step are decanted from the immiscible sludge layer and withdrawn from the process through line 12. When desired, the extractant may be recovered from the extract phase and segregated from the extracted saturated hydrocarbons, for example by fractional distillation, and recycled as fresh extractant to solvent treating zone 8.

The lower raffinate layer separated from the extractant in zone 11 is withdrawn through line 13 and charged into sludge decomposition zone 14 wherein the sludge is decomposed and the organic diluent hydrocarbons recovered therefrom. Zone 14 may be operated in accordance with any of the hereinabove specified means for decomposing the sludge intermediate product, the particular method selected depending largely upon the catalyst utilized into the sludge-forming zone. As hereinabove noted, such methods for decomposition of the sludge include aqueous hydrolysis by water alone or in solution with a suitable caustic, simple batch or vacuum distillation, or by other means known to the art. One of the preferred methods for decomposition of the sludge is by means of aqueous hydrolysis whereby the sludge is thoroughly mixed with water to decompose the catalyst-organic diluent bonds comprising the sludge. When the aqueous hydrolysis method is employed for decomposition of the sludge, the hydrolyzing medium (water, a dilute caustic, or an aqueous acid) is charged into zone 14 via line 15 and intimately contacted with the sludge in zone 14 by a suitable stirring device. The aqueous phase containing the dissolved sludge-forming catalyst released from the sludge by the hydrolytic decomposition thereof is removed from zone 14 by decantation from the organic diluent phase through line 16 and may be conveyed to a catalyst recovery plant not illustrated on the diagram, for reconcentrating the catalyst to a form suitable for utilization in the sludge-forming reaction where the anhydrous or nearly anhydrous catalyst is required to form the sludge. The upper layer separating from the aqueous phase in zone 14 contains the organic diluent hydrocarbon product of the present process which is withdrawn from zone 14 through line 17 to storage or to a distillation unit where certain fractions may be separated therefrom, for example by fractional distillation, having boiling points and other properties suitable for particular purposes.

The following example illustrates the improvements obtainable by the use of the present invention, but it is not intended to limit the invention in accordance with the data submitted.

An organic diluent was obtained by the aqueous hydrolysis of a catalyst phase prepared by reacting polymer gasoline in the presence of hydrogen fluoride. The catalyst phase was divided into two portions, one of which was subjected to extraction with petroleum ether prior to decomposition of the catalyst layer while the other was hydrolyzed without such extraction. After ten days of drying in air as a thin film at 25° C. and 50% relative humidity, drying oil recovered from the unextracted catalyst layer reached a slightly tacky semi-dry state beyond which it would not appreciably dry further. On the other hand, when hydrolysis was carried out after extracting the same catalyst phase with petroleum ether to remove saturated material, an oil was obtained which in six days dried to a hard film (as compared with 7 to 9 days for alkali-refined linseed oil under the same conditions). The drying oils obtained from the untreated and treated catalyst phase were found to have the following physical properties:

| Properties | Untreated | Treated |
| --- | --- | --- |
| Density $d_4^{20}$ | 0.859 | 0.864 |
| Gardner Color | 12 | 12 |
| Bromine Number | 181 | 198 |
| Refractive Index $N_D^{20}$ | 1.4846 | 1.4876 |
| Specific Dispersion | 138 | 135 |
| Molecular Weight | 290 | 298 |
| Molecular Formula | $C_nH_{2n-4.6}$ | $C_nH_{2n-7.6}$ |
| Number of Double Bonds Per Molecule | 3.3 | 3.8 |

The extracted material (which amounted to about 17 percent of the hydrocarbon content of the catalyst phase) was a mixture of relatively high-boiling saturated hydrocarbons with an initial boiling point of about 100° C. and a bromine number of 4.

I claim as my invention:

1. A process for the production of synthetic drying oils which comprises reacting an olefinic hydrocarbon charging stock in the presence of a conjunct polymerization catalyst comprising hydrogen fluoride to form a catalyst-hydrocarbon complex, separating the resultant reaction products into a hydrocarbon phase and a catalyst phase comprising said complex and relatively saturated higher boiling compounds, extracting said catalyst phase with a substantially non-reactive solvent boiling below about 250° C. under conditions to remove said relatively saturated higher boiling compounds without effecting conversion of said solvent, said solvent being substantially inert toward and substantially immiscible with said complex, and separating from the thus extracted catalyst phase a hydrocarbon drying oil substantially free of said compounds.

2. The process of claim 1 wherein said solvent comprises a hydrocarbon solvent.

3. The process of claim 1 wherein said solvent comprises a petroleum distillate.

4. The process of claim 1 wherein said solvent comprises pentane.

5. The process of claim 1 wherein said charging stock comprises a polymer gasoline.

6. A process for the production of synthetic drying oils which comprises reacting an olefinic hydrocarbon fraction in the presence of hydrogen fluoride at a temperature of from about 10° C. to about 93° C. and at a pressure sufficient to maintain the mixture in substantially the liquid phase, allowing the reaction mixture to settle and separating an upper hydrocarbon layer from a lower hydrogen fluoride layer comprising a hydrogen fluoride-hydrocarbon complex, and relatively saturated higher boiling compounds, extracting said hydrogen fluoride layer with a non-reactive hydrocarbon solvent boiling below 250° C. under conditions to remove said relatively saturated higher boiling compounds without effecting conversion of said solvent, and separating from the thus extracted hydrogen fluoride layer a hydrocarbon drying oil substantially free of said compounds.

7. The process of claim 6 wherein said hydrocarbon drying oil is separated from the extracted hydrogen fluoride layer by distillation.

8. The process of claim 6 further characterized in that said extracted hydrogen fluoride layer is subjected to hydrolysis and said hydrocarbon drying oil is separated from the resultant aqueous hydrogen fluoride.

9. The process of claim 6 wherein said solvent comprises pentane.

HERMAN S. BLOCH.

REFERENCES CITED

The following references are of record in the file of this patent:

UNITED STATES PATENTS

| Number | Name | Date |
| --- | --- | --- |
| 38,640 | Millochau | May 19, 1863 |
| 190,762 | Jenney | May 15, 1877 |
| 1,211,721 | Landsberg | Jan. 9, 1917 |
| 2,217,919 | Rostler et al. | Oct. 15, 1940 |
| 2,302,956 | Retailliau | Nov. 24, 1942 |
| 2,354,554 | Showalter et al. | July 25, 1944 |
| 2,371,341 | Matuszak | Mar. 13, 1945 |
| 2,371,652 | Rostler et al. | Mar. 20, 1945 |
| 2,384,735 | Frey I | Sept. 11, 1945 |
| 2,404,483 | Frey II | July 23, 1946 |